United States Patent
Katayama et al.

(10) Patent No.: US 8,334,783 B2
(45) Date of Patent: Dec. 18, 2012

(54) PROJECTION DISPLAY DEVICE

(75) Inventors: Takeshi Katayama, Yokohama (JP);
Miyuki Ikeda, Yokohama (JP);
Hirotoshi Kemi, Fujisawa (JP);
Hideharu Saito, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 274 days.

(21) Appl. No.: 12/796,739

(22) Filed: Jun. 9, 2010

(65) Prior Publication Data
US 2011/0050435 A1 Mar. 3, 2011

(30) Foreign Application Priority Data
Aug. 27, 2009 (JP) .................................. 2009-196768

(51) Int. Cl.
*G08B 21/00* (2006.01)
(52) U.S. Cl. ............................ 340/635; 340/607; 353/61
(58) Field of Classification Search .................. 340/635, 340/607, 606; 362/373, 294; 361/690, 695; 353/52, 57, 58, 60, 61; 349/161; 348/748
See application file for complete search history.

(56) References Cited

U.S. PATENT DOCUMENTS
6,111,630 A * 8/2000 Watanuki et al. ............. 349/161
7,535,711 B2 * 5/2009 Saegusa et al. ................ 361/695
7,997,736 B2 * 8/2011 Yoshimura et al. ............. 353/52

FOREIGN PATENT DOCUMENTS
JP 11-084534 3/1999

* cited by examiner

*Primary Examiner* — Anh V La
(74) *Attorney, Agent, or Firm* — Antonelli, Terry, Stout & Kraus, LLP.

(57) ABSTRACT

A projection display device includes: a dustproof filter that removes dust and a foreign material from drawn air; an air guide path that guides, to a liquid crystal panel, the cooling air blown by a suction fan; an air velocity detector that is arranged in the air guide path and detects the velocity of the cooling air that flows in the air guide path; and a CPU that determines, on the basis of the value detected by the air velocity detector, whether or not the dustproof filter is clogged. The air velocity detector detects the velocity of the cooling air by measuring the temperature of the air in the vicinity of the heat generating element that will be increased due to heat transfer generated by the heat generating element. This configuration improves accuracy in determining whether or not the dustproof filter is clogged.

10 Claims, 5 Drawing Sheets

TEMPERATURE DIFFERENCE ΔT=T−TO

RELATIONSHIP BETWEEN WIDTH OF AIR GUIDE PATH AND AVERAGE AIR VELOCITY $V_{av} \propto 1/W$

RELATIONSHIP BETWEEN VELOCITY OF AIR AND ΔT $\Delta T \propto 1/\sqrt{V}$

PROJECTION DISPLAY DEVICE

CROSS REFERENCE TO RELATED APPLICATION

This application claims priority from Japanese Patent Application JP2009-196768, filed on Aug. 27, 2009, the content of which is hereby incorporated by reference into this application.

BACKGROUND OF THE INVENTION

The present invention relates to a projection display device such as a liquid crystal projector having a cooling fan. The invention more particularly relates to a technique for accurately detecting clogging of a dustproof filter on the basis of a reduction in the velocity of cooling air.

A projection display device such as a liquid crystal projector irradiates a display element such as a liquid crystal panel with light emitted by a light source such as a mercury lamp. The projection display device enlarges and projects an image that is formed by the display element through a projection lens onto a screen. The display element is irradiated with the light emitted by the light source and is heated so that the temperature of the display element increases. When the temperature of the display element excessively increases, the display element may be transformed or the quality of the image may be degraded. To cope with this, a cooling fan to blow cooling air to the display element is provided to suppress temperature increase in the display element.

In general, a flow path for cooling air is configured so that a suction fan draws air from outside of the device through an inlet into the device and then blows the air to the display element. In order to prevent dust and a foreign material that will enter from the inlet from being attached to the display element, a dustproof filter is attached to the inlet. However, when dust or a foreign material is accumulated on the dustproof filter to cause the dustproof filter to be clogged, the amount of air that is drawn into the device is reduced, and the cooling effect is reduced. This results in an increase in the temperature of the display element. To avoid this, the velocity of the cooling air that is to be blown to the display element is detected. When the velocity of the cooling air becomes equal to or lower than a set value due to clogging of the filter or the like, a power source for the display device is turned off to protect the display element.

A liquid crystal projector described in JP-A-11-84534 is configured as follows. Liquid crystal panels are formed so as to allow cooling air to flow along the surfaces of the liquid crystal panels and an air velocity sensor is arranged on an output portion (from which the cooling air flows through the liquid crystal panels and is output) in order to accurately measure the velocity or amount of the cooling air while suppressing an effect of air blown by an exhaust fan that is located on the back side of the liquid crystal panel.

SUMMARY OF THE INVENTION

In the aforementioned conventional technique, the air velocity sensor is arranged on a downstream side (output side) to which the cooling air flows through the liquid crystal panels, to measure the velocity (or amount) of the cooling air that has passed through the liquid crystal panels. This configuration has the following problem. Turbulent air is generated in the cooling air on the downstream side of the liquid crystal panels due to presence of the liquid crystal panels, optical elements or the like, and the velocity of the cooling air easily becomes unstable. In addition, the downstream side of the liquid crystal panel is located far from an outlet of the suction fan. Thus, when the rotational speed of the suction fan is changed on the basis of the temperature of air outside of the device, a distribution of the velocity of the air is also changed. It is, therefore, difficult to accurately measure the velocity of the air. As a result, accuracy in determining whether or not a filter is clogged is worse due to a reduction in the velocity of the air, and the low accuracy may cause the temperatures of the liquid crystal panels to be increased.

An object of the present invention is to measure the velocity of cooling air with high sensitivity in a stable manner and thereby improve accuracy in determining whether or not a dustproof filter is clogged.

According to the present invention, a projection display device that enlarges and projects an image formed by a display element through a projection lens onto a screen includes: a suction fan that draws air from outside of the device through an inlet into the device and blows the cooling air to the display element; a dustproof filter that is arranged in the vicinity of the inlet and removes dust and a foreign material from the drawn air; an air guide path that guides, to the display element, the cooling air blown by the suction fan; an air velocity detector that is arranged in the air guide path and detects the velocity of the cooling air that flows in the air guide path; and a controller that determines, on the basis of the value detected by the air velocity detector, whether or not the dustproof filter is clogged. The air velocity detector includes: a reference temperature sensor that measures the temperature of the cooling air that flows in the air guide path; a heat generating element that generates a predetermined amount of heat; and a heater-vicinity temperature sensor that measures the temperature of air in the vicinity of the heat generating element that will be increased due to heat transfer generated by the heat generating element. The air velocity detector detects the velocity of the cooling air on the basis of a difference between the temperature measured by the reference temperature sensor and the temperature measured by the heater-vicinity temperature sensor.

It is preferable that the air velocity detector be located on a side surface of the air guide path but in the vicinity of an outlet of the suction fan. It is also preferable that the air guide path include a wide portion having a width that is larger than the width of the outlet of the suction fan, and at least the heat generating element and the heater-vicinity temperature sensor be arranged on the wide portion of the air guide path among the sensors and the element that are included in the air velocity detector. It is also preferable that the air velocity detector be arranged so that a plurality of the heat generating elements and the heater-vicinity temperature sensor are mounted on a common substrate and do not overlap each other in a direction in which the cooling air flows while the heat generating elements surround the heater-vicinity temperature sensor.

According to the present invention, it is possible to improve accuracy in determining, on the basis of the measured velocity of the cooling air, whether or not the dustproof filter is clogged, protect the display element, and improve reliability of the device.

DESCRIPTION OF THE PREFERRED EMBODIMENTS

An embodiment of the present invention is described below with reference to the accompanying drawings.

Figure 1:
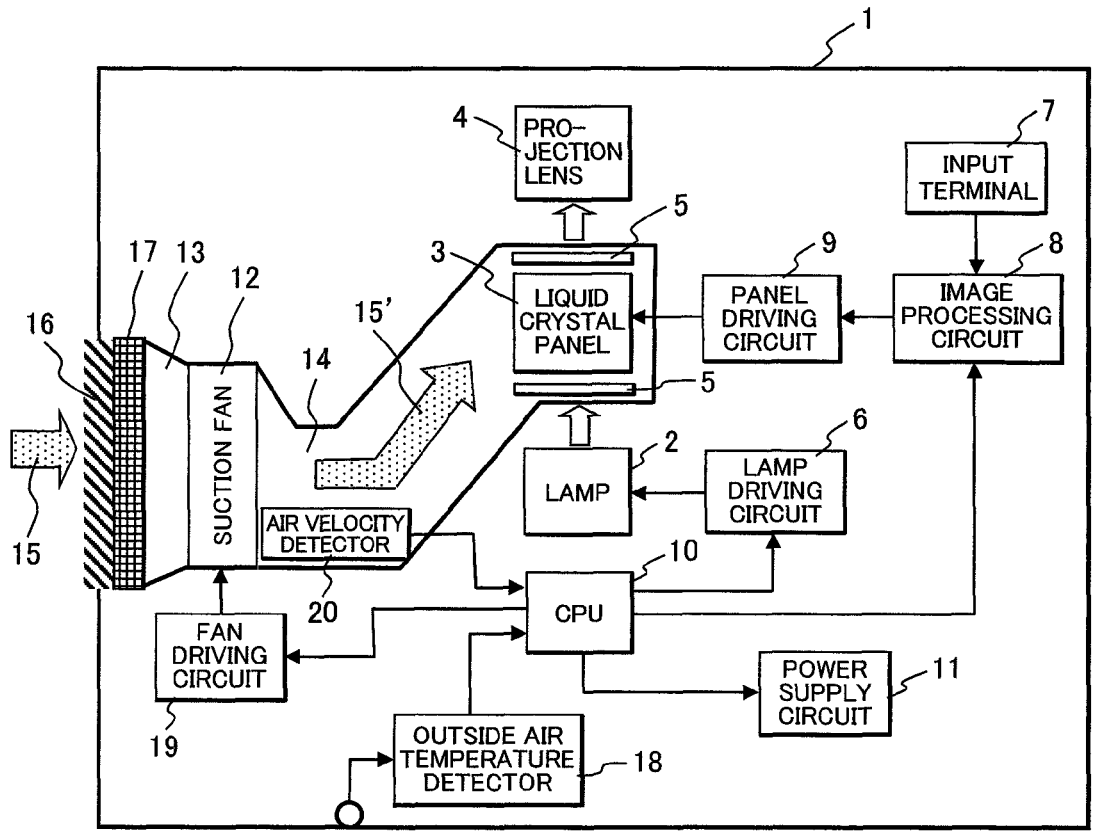
FIG. 1 is a block diagram showing the configuration of a projection display device according to an embodiment of the present invention.

FIG. 1 is a block diagram showing the configuration of a projection display device 1 according to the embodiment of the present invention.

The projection display device 1 irradiates an image formed by display elements such as liquid crystal panels 3 with light emitted by an extra-high pressure mercury lamp (light source) 2 and enlarges and projects the image through a projection lens 4 onto a screen to display the image. Each of the liquid crystal panels 3 is a transmissive or reflective display element and has an optical modulation function. The liquid crystal panels 3 are provided for red (R), green (G), and blue (B) colors, respectively. In FIG. 1, the liquid crystal panel for one color is illustrated for simplicity. The projection display device 1 has polarizing plates 5 that are located in the vicinity of the liquid crystal panels 3. The polarizing plates 5 are arranged on a light incident side and a light output side, respectively. In addition, the projection display device 1 includes optical elements such as a dichroic mirror (not shown) and a dichroic prism (not shown) in the vicinity of the liquid crystal panels 3.

A lamp driving circuit 6 turns on and drives the lamp 2. A panel driving circuit 9 transmits driving signals to the liquid crystal panels 3 so that RGB color images are formed by the respective liquid crystal panels 3. An image processing circuit 8 processes a signal supplied to an input terminal 7 and supplies an RGB signal to the panel driving circuit 9. A CPU (controller) 10 controls the lamp driving circuit 6, the image processing circuit 8, and a power supply circuit 11. Also, the CPU 10 controls rotational speed of a suction fan 12 as described later. The power supply circuit 11 supplies voltage to each circuit that is included in the display device.

Optical elements such as the liquid crystal panels 3 and the polarizing plates 5 are heated when the liquid crystal panels 3 are irradiated with the light emitted by the lamp 2 in the projection display device 1 that uses the liquid crystal panels 3 as display elements. In such a case, if measures are not taken to prevent the optical elements from being heated, the temperatures of the optical elements are increased, which may have an adverse effect on the image display. To suppress the temperature increases in the optical elements, the suction fan 12 draws air 15 from outside of the display device into the display device and blows cooling air 15' so that the cooling air 15' flows from a first air guide path 13 through a second air guide path 14 to the liquid crystal panels 3 and the polarizing plates 5. The first air guide path 13 extends from an inlet 16 to the suction fan 12, while the second air guide path 14 extends from the suction fan 12 to the liquid crystal panels 3 (polarizing plates 5). In addition, a dustproof filter 17 is installed in the vicinity of the inlet 16 in order to prevent dust and a foreign material included in the drawn air 15 from being attached to the liquid crystal panels 3 and polarizing plates 5. A panel duct that is constituted by the suction fan 12, the first air guide path 13, and the second air guide path 14 may be provided for each of the liquid crystal panels 3 for the RGB colors in order to cool the liquid crystal panel 3, while the panel ducts are independent from each other. The suction fan 12, the first air guide path 13, and the second air guide path 14 may be provided for the liquid crystal panels 3.

The CPU 10 controls the rotational speed of the suction fan 12 through a fan driving circuit 19 on the basis of data, which indicates the temperature of the outside air, acquired by an outside air temperature detector 18 and a mode selected from power modes (normal mode/power saving mode) of the lamp 2. The outside air temperature detector 18 includes a thermistor or the like. The CPU 10 may control the rotational speed of the suction fan 12 on the basis of temperature data acquired by a reference temperature sensor 21 included in an air velocity detector 20 (described later) without using the data acquired by the outside air temperature detector 18.

When dust or a foreign material is accumulated on the dustproof filter 17 to cause the dustproof filter 17 to be clogged or when the dustproof filter 17 is clogged by a paper, the outside air 15 may not sufficiently be drawn into the display device. In this case, the cooling effect may be reduced, and the temperatures of the liquid crystal panels 3 and polarizing plates 5 may be increased so that the liquid crystal panels 3 and the polarizing plates 5 become deteriorated. In order to avoid this, the air velocity detector 20 is installed in the second air guide path 14 to monitor a reduction in the velocity of the air that is caused by clogging of the dustproof filter 17. When the CPU 10 detects, on the basis of a value detected by the air velocity detector 20, that the velocity of the air becomes lower than a predetermined value, the CPU 10 controls the image processing circuit 8 to cause an alarm message that prompts cleaning of the filter to be displayed on the screen and/or controls the lamp driving circuit 6 to cause the lamp 2 to be turned off. These operations prevent the liquid crystal panels 3 and the polarizing plates 5 from being excessively heated. In the present embodiment, the air velocity detector 20 is arranged in the second air guide path 14. The second air guide path 14 is located on an upstream side of the optical elements such as the liquid crystal panels 3. Thus, turbulent air is hardly generated in the cooling air. In addition, even when the rotational speed of the suction fan 12 is changed, a distribution of the velocity of the air is not changed. The air velocity detector 20 is therefore capable of accurately measuring the velocity of the air. As a result, accuracy in determining whether or not the dustproof filter 17 is clogged is improved.

Figure 2:
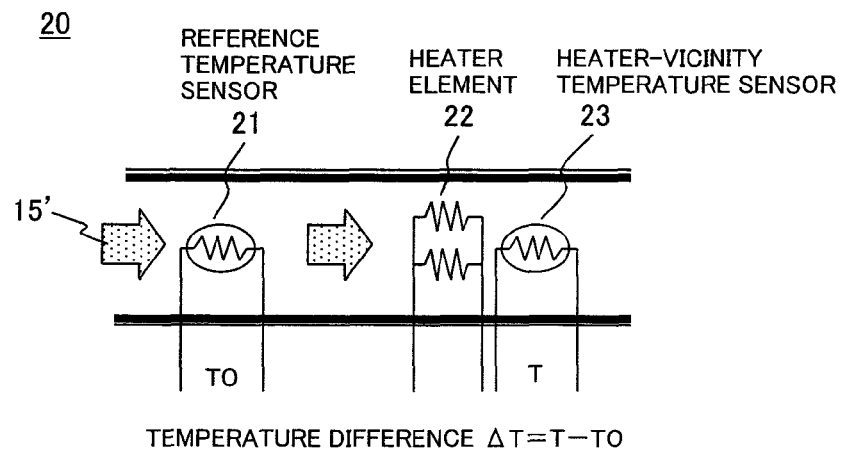
FIG. 2 is a diagram showing an operating principle of an air velocity detector.

FIG. 2 is a diagram showing an operating principle of the air velocity detector 20.

The air velocity detector 20 includes the reference temperature sensor 21, a heat generating element 22, and a heater-vicinity temperature sensor 23. The reference temperature sensor 21 is arranged on an upstream side to measure the temperature (reference temperature) of the cooling air 15' that flows in the second air guide path 14. The heat generating element 22 is a heater resistor or the like and generates a predetermined amount of heat. The heater-vicinity temperature sensor 23 is located in the vicinity of the heat generating element 22. The heater-vicinity temperature sensor 23 measures the temperature of the air in the vicinity of the heat generating element 22 that will be increased due to heat transfer generated by the heat generating element 22. Each of the temperature sensors 21 and 23 includes a thermistor or the like. A value measured by the reference temperature sensor 21 is represented by T0, while a value measured by the heater-vicinity temperature sensor 23 is represented by T. A difference $\Delta T$ (=T−T0) between the values T0 and T, which is caused by the heat generating element 22, depends on the velocity V of the cooling air. It is known that the temperature difference $\Delta T$ varies (depending on the velocity V of the cooling air) according to the following equation in theory.

$$\Delta T = \frac{k}{\sqrt{V}}$$

(k is a proportionality constant).

When the velocity V of the air is V1 (during a normal operation), the temperature difference $\Delta T1$ is represented by the following equation.

$$\Delta T1 = \frac{k}{\sqrt{V1}}$$

When the velocity V of the air is V2 (or when the velocity V of the air is reduced to V2), the temperature difference $\Delta T2$ is represented by the following equation.

$$\Delta T2 = \frac{k}{\sqrt{V2}}$$

Thus, the ratio of the temperature difference $\Delta T2$ to the temperature difference $\Delta T1$ is represented by the following equation.

$$\frac{\Delta T2}{\Delta T1} = \sqrt{\frac{V1}{V2}}$$

For example, when the velocity V of the air is reduced by ½, the temperature difference $\Delta T$ is increased by $\sqrt{2}$-fold ($\approx$1.4-fold). In this manner, a reduction in the velocity V of the air can be calculated on the basis of the increase rate of the temperature difference $\Delta T$. In this case, the temperature difference $\Delta T$ depends on the amount of heat generated by the heat generating element 22 and the arrangement of the heater-vicinity temperature sensor 23. Thus, a reference value for the temperature difference $\Delta T$ is measured for each velocity V of the air in advance. In addition, an allowable value (protecting operation point) of the increase rate of the temperature difference $\Delta T$ corresponding to the reduction in the velocity V of the air is specified. When the measured temperature difference $\Delta T$ becomes equal to or larger than the allowable value, it is determined that the filter is clogged.

Figure 3:
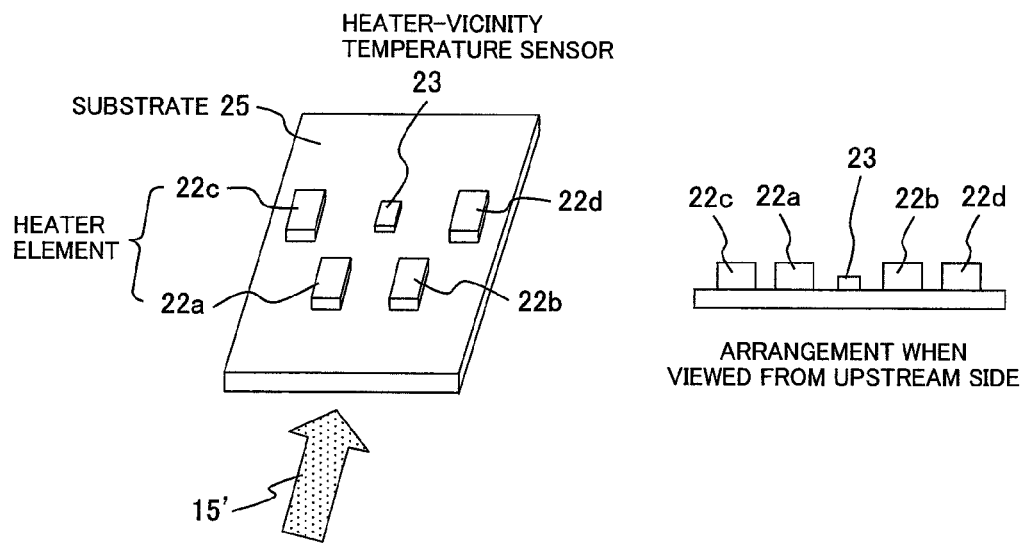
FIG. 3 is a diagram showing an example of the configuration of the air velocity detector.

FIG. 3 is a diagram showing an example of the configuration of the air velocity detector 20 and showing in detail the arrangement of the heat generating element 22 and the heater-vicinity temperature sensor 23. The reference temperature sensor 21 is arranged on the upstream side and is located far from the heat generating element 22 so as not to be thermally affected by the heat generating element 22.

The heat generating element 22 and the heater-vicinity temperature sensor 23 are mounted on a common substrate 25. Heat generated by the heat generating element 22 is transferred through the substrate 25 to the temperature sensor 23. The heat generating element 22 includes a plurality of elements (four elements 22a to 22d in this example). The heat generating elements 22a to 22d surround the temperature sensor 23 and are arranged in the vicinity of the temperature sensor 23 to improve the efficiency of heat transfer (sensitivity of the temperature sensor 23). In this case, the efficiency of heat transfer is high when the heat generating elements 22a to 22d are arranged on the upstream side of the temperature sensor 23 (and/or are arranged side by side with the temperature sensor 23 in a lateral direction). Each of the heat generating elements 22a to 22d is formed in a rectangular parallelepiped shape. Thus, the heat generating elements 22a to 22d may easily prevent the flow of the cooling air 15' and cause turbulent air. Thus, the heat generating elements 22a to 22d and the temperature sensor 23 do not overlap each other in the direction in which the cooling air 15' flows so that each element is not affected by turbulent air that is caused by the other elements. The heat generating elements 22a to 22d are arranged in bilateral symmetry about the temperature sensor 23. Thus, the temperature sensor 23 can measure the temperature of the air in a stable manner even when the direction in which the cooling air 15' flows is slightly changed. An appropriate number of heat generating elements 22 is 4 in consideration of the sensitivity of the temperature sensor 23 and stability against turbulent air.

Figure 4:
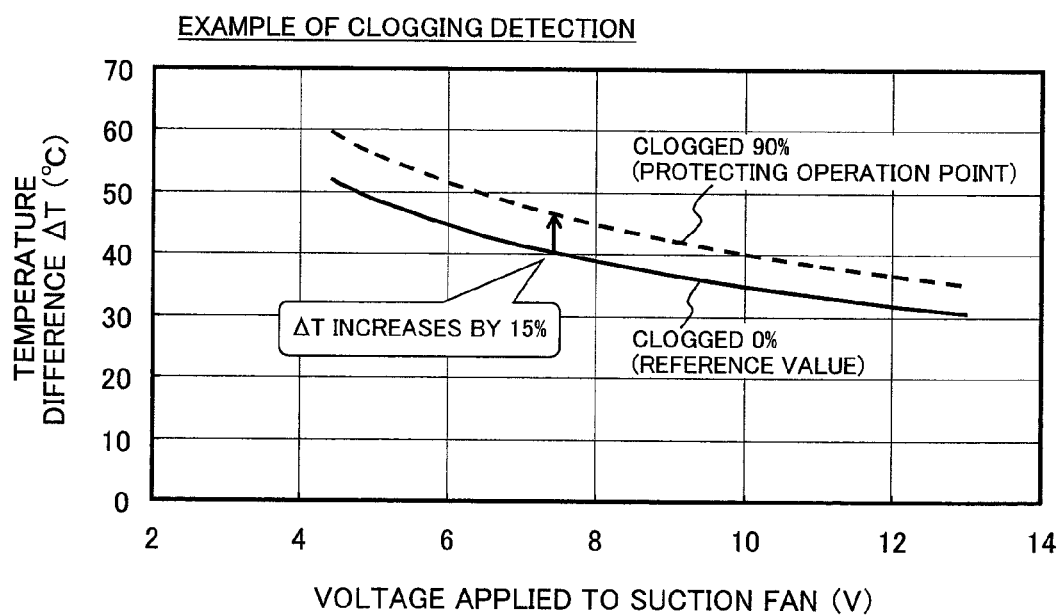
FIG. 4 is a diagram exemplifying clogging detection that is performed in the projection display device.

FIG. 4 is a diagram exemplifying clogging detection that is performed in the projection display device according to the present embodiment.

In FIG. 4, the abscissa indicates voltage that is applied to the suction fan 12, while the ordinate indicates the temperature difference $\Delta T$ that is measured by the air velocity detector 20. The case in which the dustproof filter 17 is not clogged at all (0% (reference value)) is compared with the case in which the dustproof filter 17 is clogged 90%. When the dustproof filter 17 is clogged, the velocity of the cooling air is reduced. In this example, the temperature difference $\Delta T$ that is measured by the air velocity detector 20 is increased by approximately 15% in comparison with the reference value. This increase rate is approximately constant regardless of the voltage that is applied to the suction fan 12. For example, the increase rate (of the temperature difference $\Delta T$) of 15% is specified as the protecting operation point. When the increase rate of the temperature difference $\Delta T$ becomes equal to or larger than 15%, it is determined that the filter is clogged, and the alarm message is displayed. In addition, when this alarm state continues for a long time, the lamp 2 is turned off to protect the optical elements such as the liquid crystal panels 3 and the polarizing plates 5.

Next, the inner configuration of the projection display device according to the present embodiment and the structures of cooling systems are described.

Figure 5A:
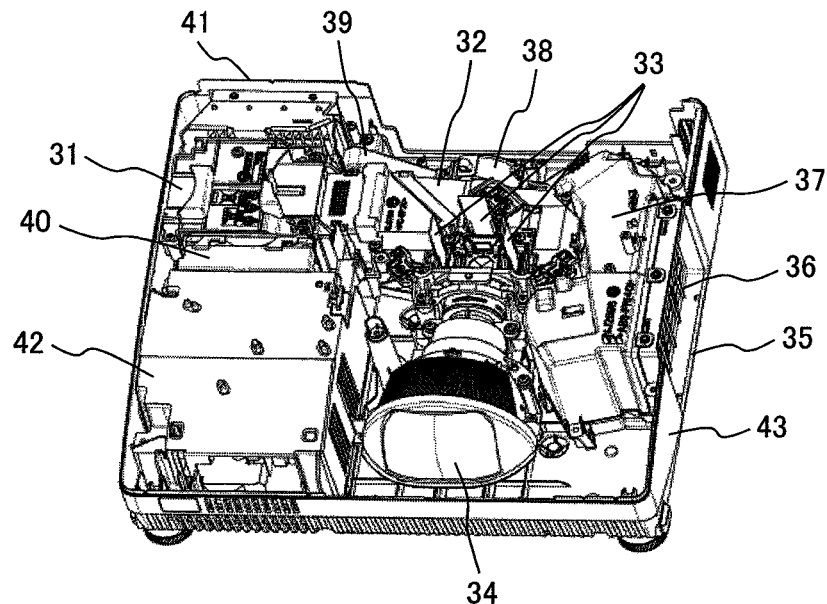
FIG. 5A is a perspective view of the inner configuration of the projection display device.

FIG. 5A is a perspective view of the inner configuration of the projection display device and shows the state in which an upper cover, a substrate, and a terminal portion are removed. An optical system includes a lamp unit 31, an optical engine 32, liquid crystal panels 33, and a projection lens 34. The lamp unit 31 includes a lamp light source. The optical engine 32 includes a dichroic mirror that serves as a spectroscopic unit and a dichroic prism that serves as a photosynthetic unit. The liquid crystal panels 33 serve as display elements. A cooling system for the liquid crystal panels 33 includes an inlet 35, a dustproof filter 36, and a panel duct 37. Air is drawn from outside of the display device through the inlet 35 into the display device. The dustproof filter 36 removes dust and a foreign material from the drawn air. The panel duct 37 includes a suction fan and air guide paths. A cooling system for the lamp unit 31 includes a lamp fan 38, a lamp duct 39, a discharge fan 40, and an outlet 41. Those parts and a power supply unit 42 are included in a bottom case 43.

Figure 5B:
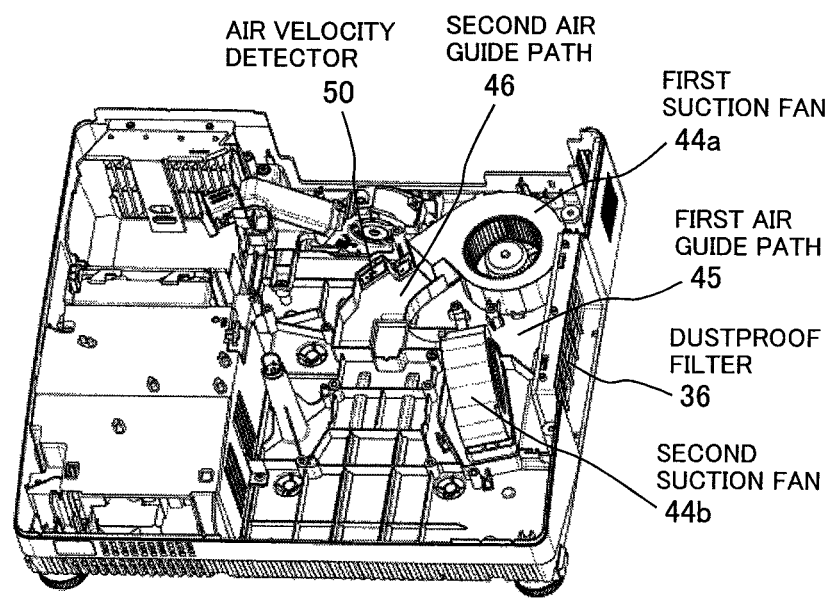
FIG. 5B is a perspective view of the structure of a cooling system shown in FIG. 5A.

FIG. 5B is a perspective view of the structure of the cooling system shown in FIG. 5A and shows the inner structure of the panel duct 37 in the state in which the optical system is removed. In FIG. 5B, as the suction fan, a first suction fan 44a and a second suction fan 44b are provided. The first suction fan 44a is provided for the panels for red and green colors, while the second suction fan 44b is provided for the panel for blue color. Both the first and second suction fans 44a and 44b have a sirocco fan structure. The first suction fan 44a is arranged horizontally, while the second suction fan 44b is arranged upright. The air is drawn from the inlet 35 and is blown through the dustproof filter 36 to a first air guide path 45. Then, the first and second suction fans 44a and 44b blow the air to a second air guide path 46 so that the cooling air is supplied to each liquid crystal panel 33.

An air velocity detector 50 is installed in the second air guide path 46 but in the vicinity of an outlet of the first suction fan 44a or an outlet of the second suction fan 44b. In this example, the air velocity detector 50 is located in the vicinity of the outlet of the first suction fan 44a. The air velocity detector 50 includes a reference temperature sensor 51, a heat generating element 52, and a heater-vicinity temperature sensor 53 and is mounted on a substrate, as shown in FIGS. 2 and 3. The substrate is fixed to a predetermined portion of the second air guide path 46. An end surface of the substrate is preferably surrounded by wall surfaces of the second air guide path 46 so that the end surface of the substrate is not exposed to the second air guide path 46. This structure prevents dust produced from the end surface of the substrate from scattering to the second air guide path 46 and being attached to the display elements.

The following describes three examples of the arrangement of the temperature sensors that are included in the air velocity detector 50.

First Embodiment

Figure 6A:
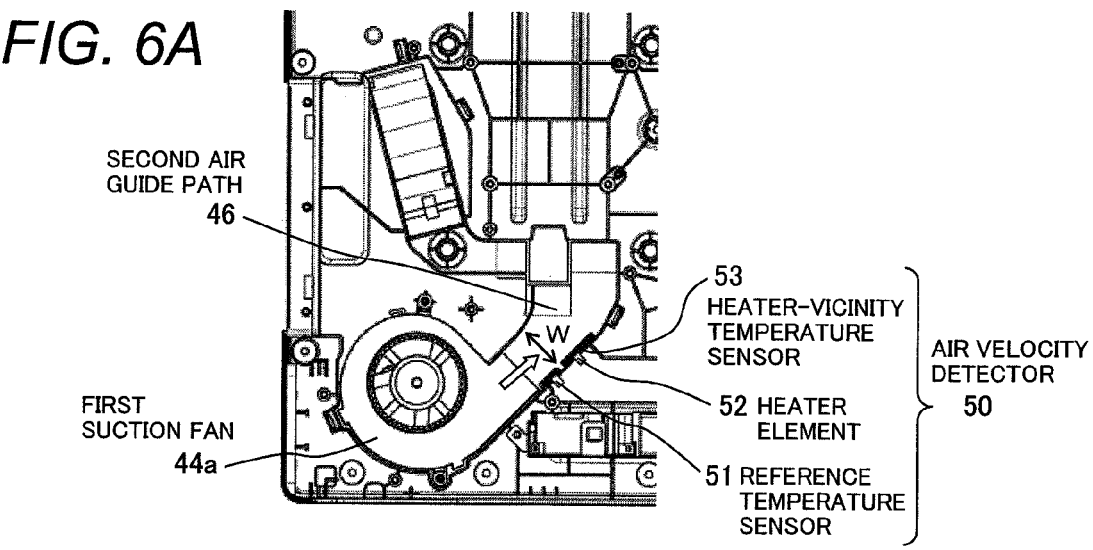
FIG. 6A is a plan view of a first example of the arrangement of the air velocity detector.

FIG. 6A is a plan view of a first example of the arrangement of the air velocity detector 50. The air velocity detector 50 is arranged on a side surface of the second air guide path 46 but in the vicinity of the outlet of the first suction fan 44a. The second air guide path 46 extends from the outlet of the first suction fan 44a, and the width W of the second air guide path 46 is substantially equal to the width of the outlet. The reference temperature sensor 51, the heat generating element 52, and the heater-vicinity temperature sensor 53 are arranged in the order from the upstream side in the direction in which the cooling air flows. The reference temperature sensor 51 is mounted on a first substrate, while the heat generating element 52 and the heater-vicinity temperature sensor 53 are mounted on a second substrate. The first substrate is separated from the second substrate. Thus, the reference temperature sensor 51 is not thermally affected by the heat generating element 52. In addition, the heater-vicinity temperature sensor 53 efficiently detects an increase in the temperature of the air that is heated by the heat generating element 52. Even when the amount of the air blown by the first suction fan 44a is constant, a velocity distribution of the air that flows in the second air guide path 46 is not uniform. When the first suction fan 44a is a sirocco fan, the velocity of the air that flows on the side surface of the second air guide path 46 is lower than the velocity of the air that flows in a central region of the second air guide path 46. The reference temperature sensor 51 is not affected by the velocity of the air. As the velocity of the air is lower, the temperature of the air in the vicinity of the heater-vicinity temperature sensor 53 is higher. Thus, since the air velocity detector 50 is arranged on the side surface of the second air guide path 46, sensitivity in detecting an increase (reduction in the velocity of the air) in the temperature of the air can be improved. The velocity of the air that flows on an upper or lower surface of the second air guide path 46 is also lower than the velocity of the air that flows in the central region of the second air guide path 46. Thus, even when the air velocity detector 50 is arranged on the upper or lower surface of the second air guide path 46, the detection sensitivity can be improved.

Second Embodiment

Figure 6B:
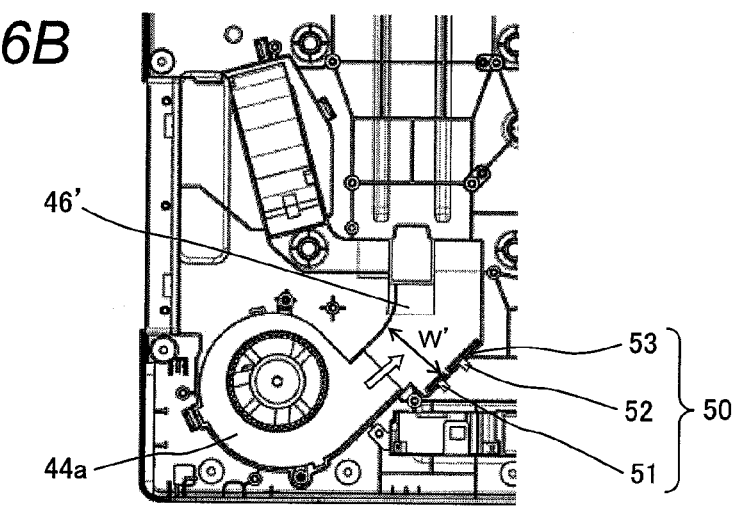
FIG. 6B is a plan view of a second example of the arrangement of the air velocity detector.

FIG. 6B is a plan view of a second example of the arrangement of the air velocity detector 50. In this example, the width W' of a second air guide path 46' is larger than the width of the outlet of the suction fan 44a. The air velocity detector 50 is arranged on a side surface of a wide portion (having the width W') of the second air guide path 46'. The velocity of the air that flows in the second air guide path 46' is low. Thus, detection sensitivity of the air velocity detector 50 can be improved. The reason is described below.

Figure 7:
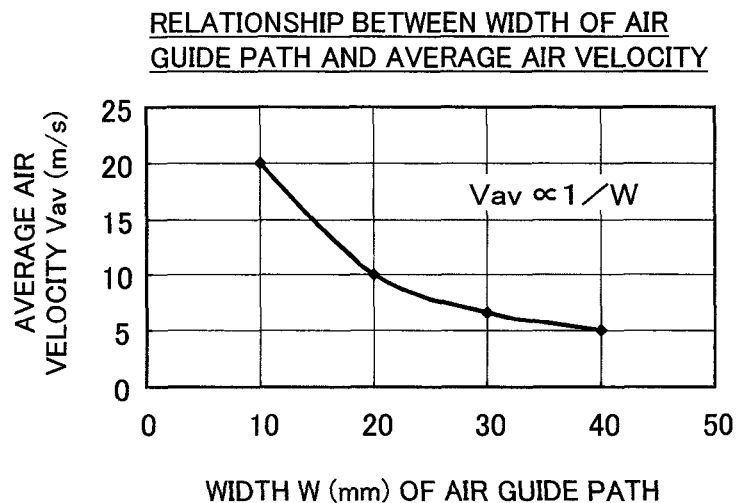
FIG. 7 is a diagram showing the relationship between the width of an air guide path and the average velocity of air that flows in the air guide path.

FIG. 7 is a diagram showing the relationship between the width of the air guide path and the average velocity of the air that flows in the air guide path. When the air volume is constant, the average velocity Vav of the air is in inverse proportion to the width W of the air guide path (Vav ∝ 1/W). Since the width of the second air guide path 46' is increased to the width W', the average velocity Vav of the air that flows in the second air guide path 46' can be reduced. In addition, the velocity of the air that flows on the side surface of the second air guide path 46' is lower than the velocity of the air that flows in the central region of the second air guide path 46', as described in the first embodiment.

Figure 8:
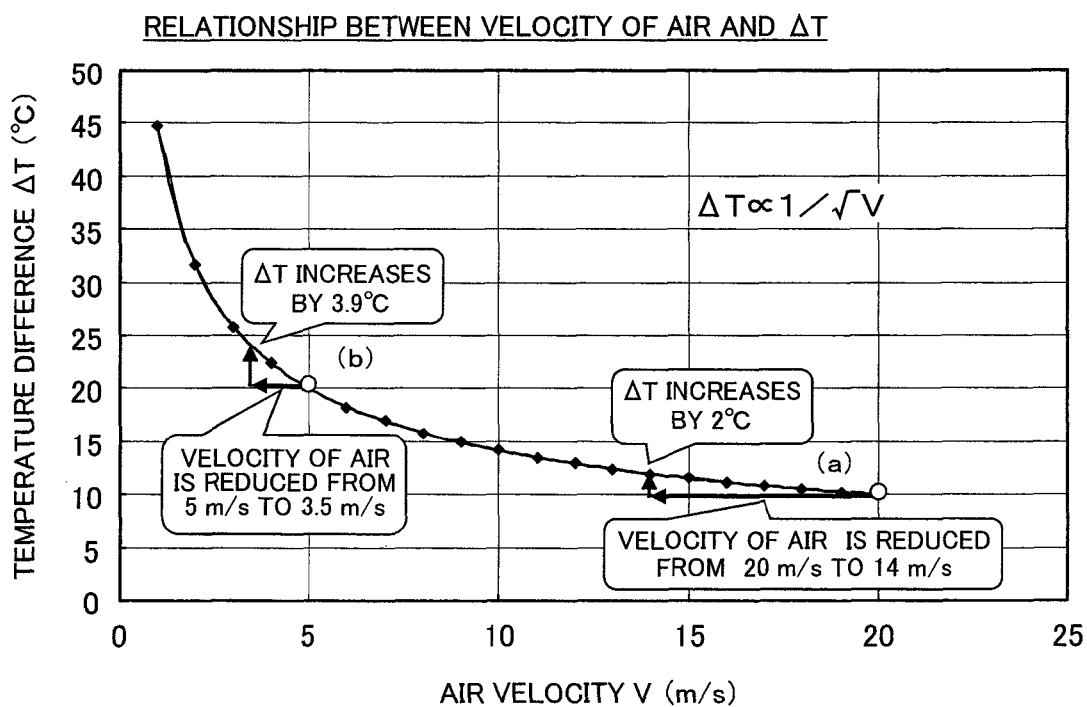
FIG. 8 is a diagram showing the relationship between the velocity (of air) detected by the air velocity detector and a difference between measured temperatures.

FIG. 8 is a diagram showing the relationship between the velocity V (of the air) measured by the air velocity detector 50 and a temperature difference ΔT measured by the air velocity detector 50. The temperature difference ΔT is a difference between a value T measured by the heater-vicinity temperature sensor 53 and a value T0 measured by the reference temperature sensor 51. As described above, the following relationship is satisfied.

$$\Delta T \propto \frac{1}{\sqrt{V}}$$

It is assumed that when the velocity V is equal to 20 m/s in a case (a) and is equal to 5 m/s in a case (b), the velocity V is reduced by 30% due to the fact that the filter is clogged. In the case (a), the velocity V is reduced to 14 m/s, and the temperature difference ΔT is increased by 2° C. due to the reduction in the velocity V. In the case (b), the velocity V is reduced to 3.5 m/s, and the temperature difference ΔT is increased by 3.9° C. due to the reduction in the velocity V. As the velocity V of the air is lower, the ratio of the increase in the temperature difference ΔT to the reduction in the velocity is larger. Thus, improvement in detection sensitivity of the air velocity detector 50 is attained.

In the configuration shown in FIG. 6B, the sensitivity in detecting clogging of the filter can be improved compared with the case in which the configuration described in the first embodiment is used.

Third Embodiment

Figure 6C:
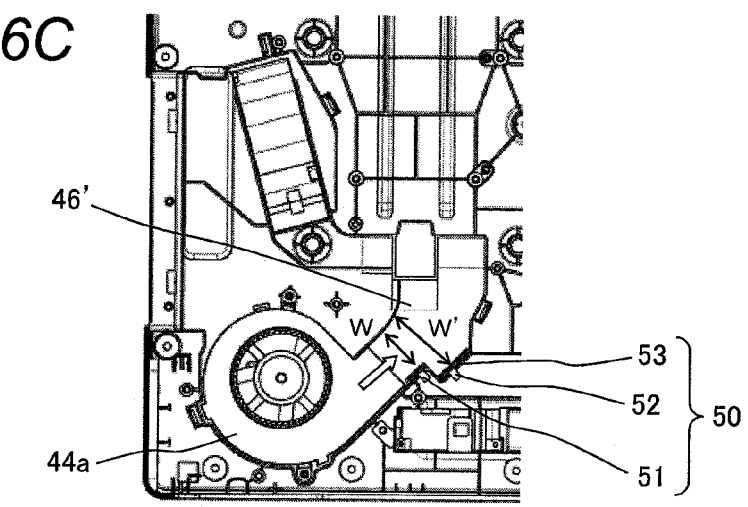
FIG. 6C is a plan view of a third example of the arrangement of the air velocity detector.

FIG. 6C is a plan view of a third example of the arrangement of the air velocity detector 50. In this example, the width W' of the second air guide path 46' is larger than the width W of the outlet of the first suction fan 44a in the same manner as the second embodiment. In addition, the heat generating element 52 and the heater-vicinity temperature sensor 53 that are included in the air velocity detector 50 are arranged on the side surface of the wide portion (having the width W') of the second air guide path 46', while the reference temperature sensor 51 included in the air velocity detector 50 is arranged on a side surface of a portion (that extends from the outlet of the first suction fan 44a and has the same width W as the outlet of the first suction fan 44a) of the second air guide path 46'. In this configuration, since the air velocity detector 50 is arranged on the wide portion (in which the velocity of the air is low) of the second air guide path 46', the detection sensitivity can be improved. In addition, the velocity of the cooling air becomes lower at a step portion that is a boundary between the wide portion and the portion having the same width as the outlet. Since the heat generating element 52 and the heater-vicinity temperature sensor 53 are arranged on the wide portion, the detection sensitivity can be improved. In this example, although the reference temperature sensor 51 is arranged in the region in which the velocity of the air is different (higher), the temperature of the cooling air does not depend on the velocity of the cooling air. Thus, there is no restriction on the arrangement of the reference temperature sensor 51.

The embodiments of the present invention may be modified as follows.

(1) The liquid crystal panels are used as the display elements in the embodiments. In addition to the transmissive and reflective liquid crystal panels, the display elements can be applied to digital micromirror device panels that use electric fields to control inclinations of minute mirrors.

(2) Display elements and suction fans used are not limited in number. The number of the display elements may be 1 or more. The suction fans may be provided for the respective display elements. Alternatively, a single suction fan may be provided for the display elements.

The invention claimed is:

1. A projection display device that enlarges and projects an image formed by a display element through a projection lens onto a screen, the display device comprising:
a suction fan that draws air from outside of the device through an inlet into the device and blows the cooling air to the display element;
a dustproof filter that is arranged in the vicinity of the inlet and removes dust and a foreign material from the drawn air;
an air guide path that guides, to the display element, the cooling air blown by the suction fan;
an air velocity detector that is arranged in the air guide path and detects the velocity of the cooling air that flows in the air guide path; and
a controller that determines, on the basis of the value detected by the air velocity detector, whether or not the dustproof filter is clogged;
wherein the air velocity detector includes a reference temperature sensor that measures the temperature of the cooling air that flows in the air guide path, a heat generating element that generates a predetermined amount of heat, and a heater-vicinity temperature sensor that measures the temperature of air in the vicinity of the heat generating element that will be increased due to heat transfer generated by the heat generating element,
the reference temperature sensor, the heat generating element and the heater-vicinity temperature sensor of the air velocity detector are arranged, within a flow path for the cooling air at the air guide path, in order of the reference temperature sensor, the heat generating element, and the heater-vicinity temperature sensor from the suction fan side, and
the air velocity detector detects the velocity of the cooling air on the basis of a difference between the temperature measured by the reference temperature sensor and the temperature measured by the heater-vicinity temperature sensor.

2. The projection display device according to claim 1, wherein
the air velocity detector is located on a side surface of the air guide path but in the vicinity of an outlet of the suction fan.

3. The projection display device according to claim 2, wherein
the air guide path includes a wide portion having a width that is larger than the width of the outlet of the suction fan, and
at least the heat generating element and the heater-vicinity temperature sensor are arranged on the wide portion of the air guide path among the sensors and the element that are included in the air velocity detector.

4. The projection display device according to claim 1, wherein
the air velocity detector compares the difference between the temperature measured by the reference temperature sensor and the temperature measured by the heater-vicinity temperature sensor with a reference temperature difference and calculates a reduction rate of the velocity of the cooling air on the basis of an increase rate of the difference between the measured temperatures, and
the controller determines that the dustproof filter is clogged when the reduction rate calculated by the air velocity detector is equal to or lower than a predetermined value.

5. The projection display device according to claim 1, wherein
the air velocity detector is arranged so that a plurality of the heat generating elements and the heater-vicinity temperature sensor are mounted on a common substrate and do not overlap each other in a direction in which the cooling air flows while the heat generating elements surround the heater-vicinity temperature sensor.

6. The projection display device according to claim 1, wherein
the controller controls rotational speed of the suction fan on the basis of the temperature measured by the reference temperature sensor that is included in the air velocity detector.

7. The projection display device according to claim 1, wherein
when the controller determines that the dustproof filter is clogged, the controller causes an alarm prompting cleaning of the dustproof filter to be displayed on the screen and causes a light source to be turned off, the light source being used in order to enlarge and project the image.

8. A projection display device that enlarges and projects an image formed by a display element through a projection lens, the display device comprising:
- a dustproof filter through which air that is drawn from outside of the device through an inlet into the device passes;
- a suction fan that blows, to the display element, the cooling air that has passed through the dustproof filter;
- an air guide path that guides, to the display element, the cooling air blown by the suction fan;
- a reference temperature sensor that measures the temperature of the cooling air that flows in the air guide path;
- a heat generating element that is arranged in the air guide path and generates a predetermined amount of heat;
- a heater-vicinity temperature sensor that is arranged in the air guide path and measures the temperature of air in the vicinity of the heat generating element; and
- a controller that prevents the display element from being excessively heated;

wherein:
- the reference temperature sensor, the heat generating element and the heater-vicinity temperature sensor of the air velocity detector are arranged, within a flow path for the cooling air at the air guide path, in order of the reference temperature sensor, the heat generating element, and the heater-vicinity temperature sensor from the suction fan side, and
- when a difference between the temperature measured by the reference temperature sensor and the temperature measured by the heater-vicinity temperature sensor is equal to or larger than a predetermined value, the controller causes an alarm prompting cleaning of the dustproof filter to be displayed and causes a light source to be turned off, the light source being used in order to enlarge and project the image.

9. A projection display device that enlarges and projects an image formed by a liquid crystal panel through a projection lens onto a screen, the display device comprising:
- a suction fan that draws air from outside of the device through an inlet into the device and blows the cooling air to the liquid crystal panel;
- a dustproof filter that is arranged in the vicinity of the inlet and removes dust and a foreign material from the drawn air;
- a first air guide path that guides, to the suction fan, the air that has passed through the dustproof filter;
- a second air guide path that guides, to the liquid crystal panel, the cooling air blown by the suction fan;
- a reference temperature sensor that measures the temperature of the cooling air that flows in the second air guide path;
- a heat generating element that is arranged in the second air guide path and generates a predetermined amount of heat;
- a heater-vicinity temperature sensor that measures the temperature of air in the vicinity of the heat generating element; and
- a controller that determines whether or not the dustproof filter is clogged;

wherein:
- the reference temperature sensor, the heat generating element and the heater-vicinity temperature sensor of the air velocity detector are arranged, within a flow path for the cooling air at the second air guide path, in order of the reference temperature sensor, the heat generating element, and the heater-vicinity temperature sensor from the suction fan side, and
- the reference temperature sensor is mounted on a first substrate that is fixed to a side surface of the second air guide path but in the vicinity of an outlet of the suction fan,
- the heat generating element and the heater-vicinity temperature sensor are mounted on a second substrate that is fixed to the side surface of the second air guide path but on a downstream side of the first substrate, and
- the controller determines that the dustproof filter is clogged when a difference between the temperature measured by the reference temperature sensor and the temperature measured by the heater-vicinity temperature sensor is equal to or larger than a predetermined value.

10. The projection display device according to claim 9, wherein
- the second air guide path includes a wide portion having a width that is larger than the width of the outlet of the suction fan, and
- the second substrate is arranged on the wide portion of the second air guide path.

\* \* \* \* \*